United States Patent
Srnec et al.

(10) Patent No.: US 11,539,210 B2
(45) Date of Patent: Dec. 27, 2022

(54) POWER AND FAULT MANAGEMENT OF ELECTRICAL COMPONENTS OF A TRANSPORT CLIMATE CONTROL SYSTEM POWERED BY AN ELECTRIC VEHICLE

(71) Applicant: THERMO KING LLC, Minneapolis, MN (US)

(72) Inventors: Matthew Srnec, Minnetonka, MN (US); Ryan Wayne Schumacher, Bloomington, MN (US); Frederico Cesar Mendes Calil, Lakeville, MN (US)

(73) Assignee: THERMO KING LLC, Minneapolis, MN (US)

( * ) Notice: Subject to any disclaimer, the term of this patent is extended or adjusted under 35 U.S.C. 154(b) by 146 days.

(21) Appl. No.: 16/678,596

(22) Filed: Nov. 8, 2019

(65) Prior Publication Data
US 2021/0143641 A1     May 13, 2021

(51) Int. Cl.
| | |
|---|---|
| H02J 3/14 | (2006.01) |
| H02J 7/00 | (2006.01) |
| H02J 9/06 | (2006.01) |
| B60H 1/00 | (2006.01) |
| H02J 1/08 | (2006.01) |

(52) U.S. Cl.
CPC ............ *H02J 3/14* (2013.01); *B60H 1/00428* (2013.01); *H02J 1/086* (2020.01); *H02J 7/0068* (2013.01); *H02J 9/061* (2013.01); *H02J 2310/48* (2020.01)

(58) Field of Classification Search
CPC .. H02J 3/14; H02J 1/086; H02J 7/0068; H02J 9/061; H02J 2310/48; B60H 1/00428
See application file for complete search history.

(56) References Cited

U.S. PATENT DOCUMENTS

| | | | |
|---|---|---|---|
| 6,223,546 | B1 | 5/2001 | Chopko et al. |
| 3,000,858 | A1 | 8/2011 | Tonegawa et al. |
| | | (Continued) | |

FOREIGN PATENT DOCUMENTS

| | | |
|---|---|---|
| EP | 2679418 | 1/2014 |
| EP | 2031443 | 5/2016 |
| | (Continued) | |

OTHER PUBLICATIONS

Extended European Search Report, issued in the corresponding European patent application No. 20206329.3, dated Apr. 7, 2021, 10 pages.

*Primary Examiner* — Carlos Amaya
(74) *Attorney, Agent, or Firm* — Hamre, Schumann, Mueller & Larson, P.C.

(57) ABSTRACT

A power management system for managing power of a climate control unit (CCU) configured to be used with at least one of an electric vehicle, a trailer, or a transport container and at least partially powered by the electric vehicle is disclosed. The system includes a power distribution system that includes a power input, a power distributor electrically connected to the power input, a fault detecting and isolating circuit electrically connected to the power input, and a connection point for receiving the CCU. The connection point is electrically connected to the fault detecting and isolating circuit. A power controller is electrically connected to the power distribution system. The power controller includes a processor and a memory.

17 Claims, 9 Drawing Sheets

(56) References Cited

U.S. PATENT DOCUMENTS

| | | | |
|---|---|---|---|
| 8,295,950 B1* | 10/2012 | Wordsworth | B60L 1/003 |
| | | | 700/297 |
| 9,024,579 B2 | 5/2015 | Igata | |
| 9,024,586 B2 | 5/2015 | Vance et al. | |
| 9,627,902 B2 | 4/2017 | Kamishima | |
| 10,107,536 B2 | 10/2018 | Senf, Jr. et al. | |
| 10,112,487 B1 | 10/2018 | Lee et al. | |
| 10,317,119 B2 | 6/2019 | Zou | |
| 10,369,896 B2 | 8/2019 | Namudur et al. | |
| 2005/0001431 A1 | 1/2005 | Sauer et al. | |
| 2006/0053814 A1 | 3/2006 | Naik et al. | |
| 2007/0212598 A1 | 9/2007 | Iida et al. | |
| 2008/0116830 A1 | 5/2008 | Gonzalez et al. | |
| 2010/0271172 A1 | 10/2010 | Takikita | |
| 2011/0213983 A1 | 9/2011 | Staugaitis et al. | |
| 2014/0049216 A1 | 2/2014 | Nakagawa et al. | |
| 2015/0298680 A1 | 10/2015 | Matthews | |
| 2017/0072813 A1 | 3/2017 | Martin et al. | |
| 2018/0065446 A1 | 3/2018 | Hansson et al. | |
| 2018/0273018 A1 | 9/2018 | Follen et al. | |
| 2019/0183438 A1 | 6/2019 | Lee et al. | |
| 2019/0184483 A1 | 6/2019 | Lee et al. | |
| 2019/0193523 A1 | 6/2019 | Takeuchi et al. | |
| 2019/0291665 A1 | 9/2019 | Martin | |
| 2021/0223302 A1* | 7/2021 | Silliman | G01R 31/005 |

FOREIGN PATENT DOCUMENTS

| | | |
|---|---|---|
| JP | 6351301 | 7/2018 |
| WO | 2006132070 | 12/2006 |
| WO | 2010/002644 | 1/2010 |
| WO | 2010009502 | 1/2010 |
| WO | 2010094302 | 8/2010 |
| WO | 2010145971 | 12/2010 |
| WO | 2011/078109 | 6/2011 |
| WO | 2014/002244 | 1/2014 |

* cited by examiner

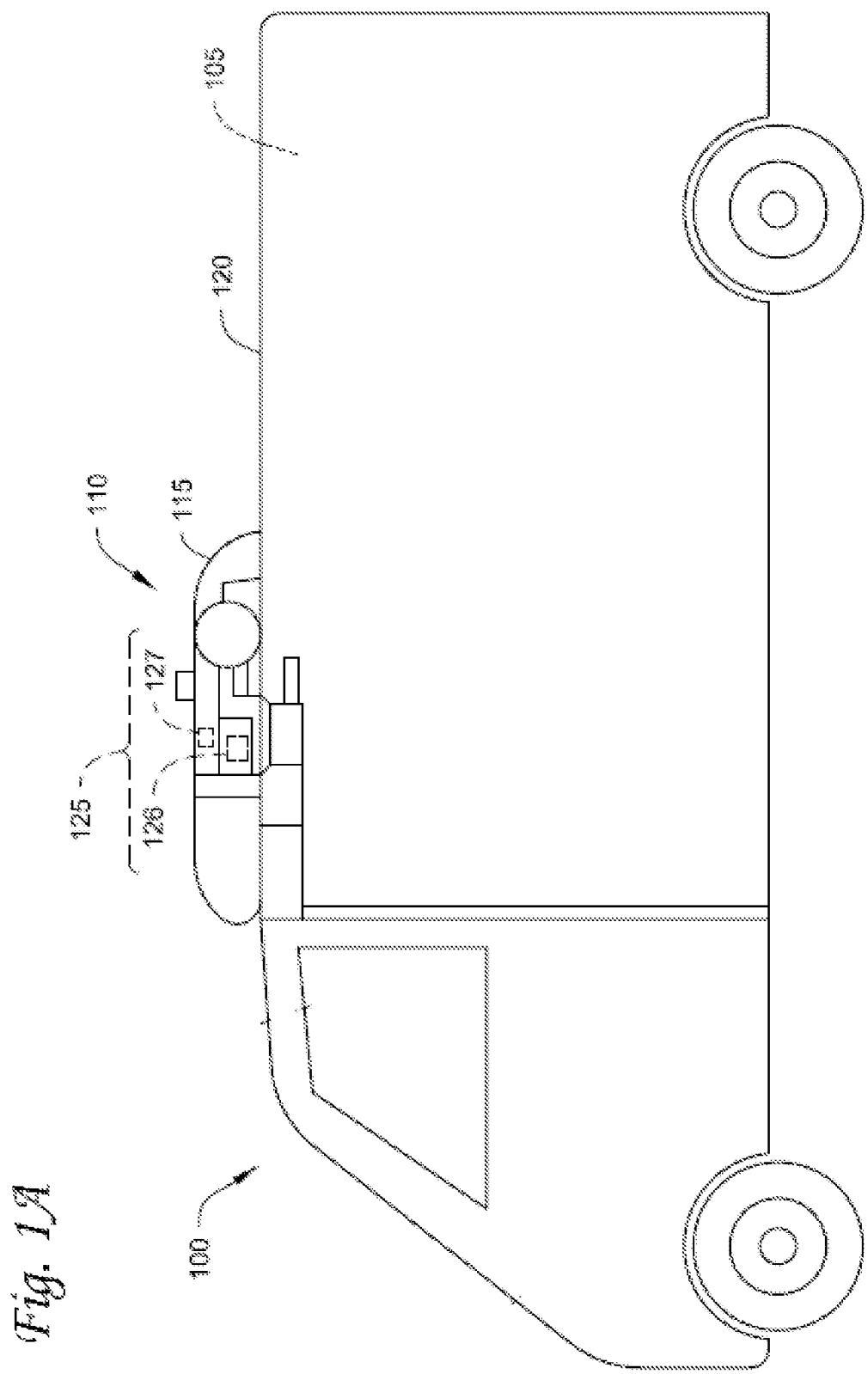

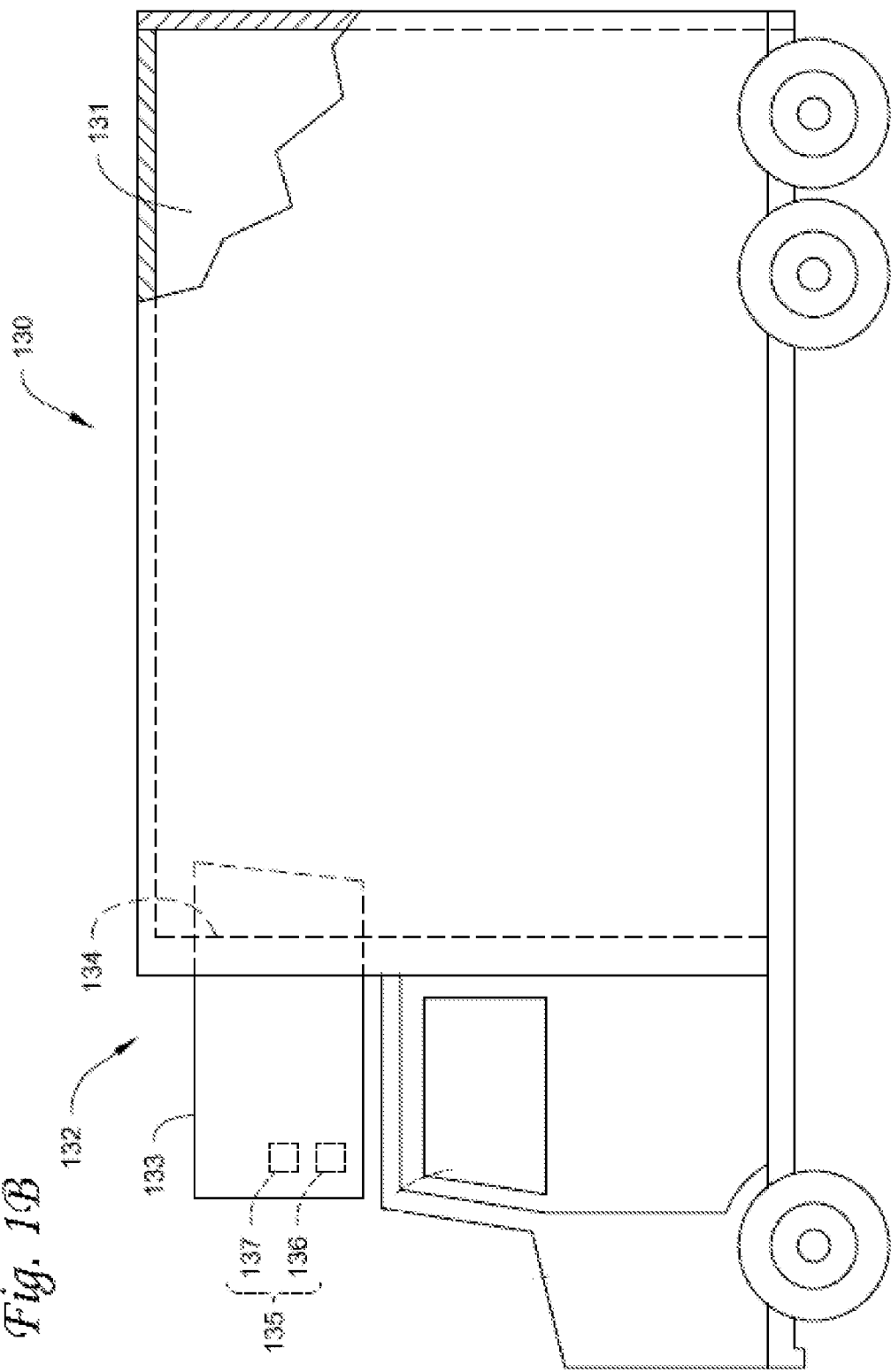

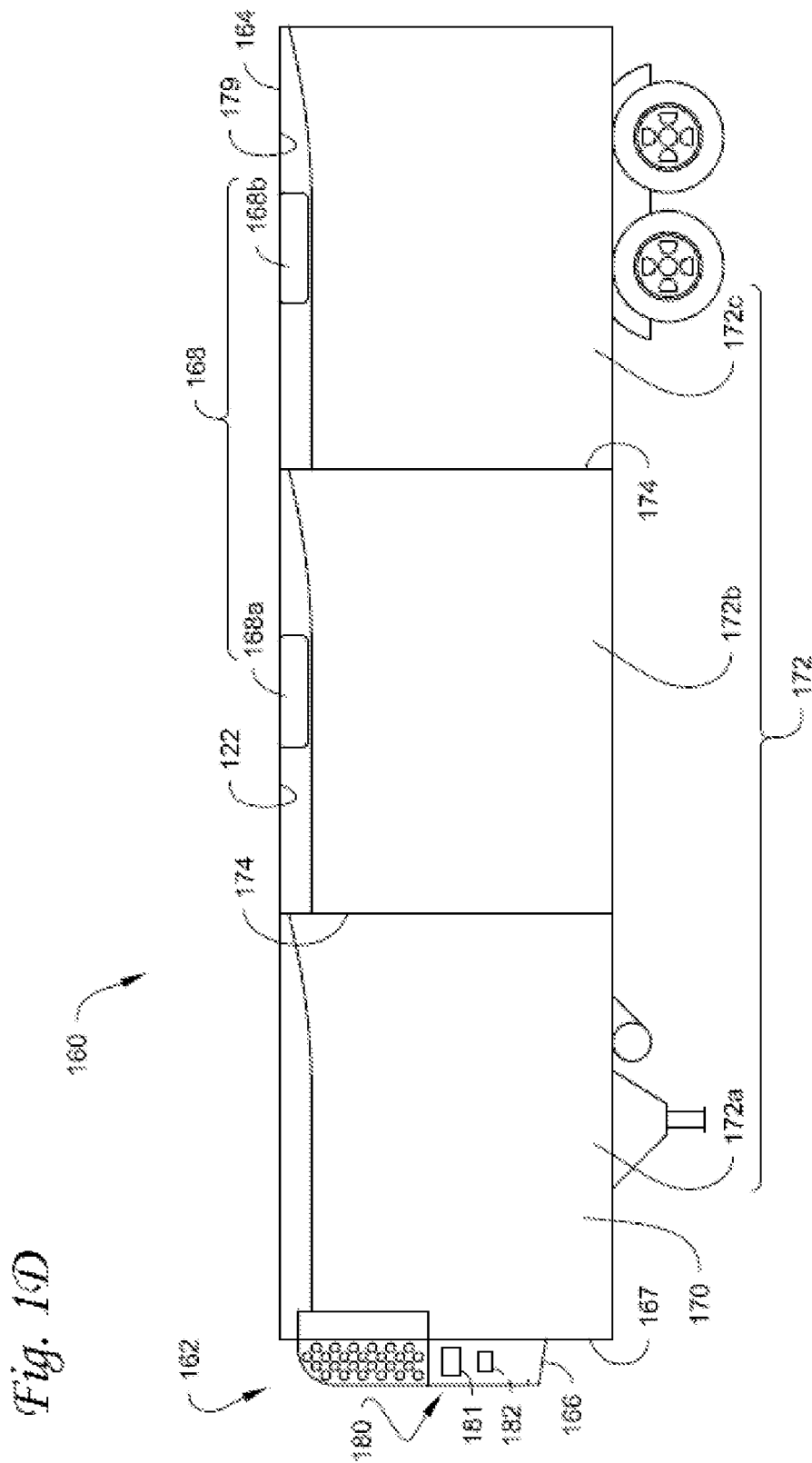

POWER AND FAULT MANAGEMENT OF ELECTRICAL COMPONENTS OF A TRANSPORT CLIMATE CONTROL SYSTEM POWERED BY AN ELECTRIC VEHICLE

FIELD

This disclosure relates generally to power and fault management of an electrically powered accessory component configured to be used with at least one of an electric vehicle, a trailer, or a transport container that is at least partially powered by the electric vehicle.

BACKGROUND

A transport climate control system can include, for example, a transport refrigeration system (TRS) and/or a heating, ventilation and air conditioning (HVAC) system. A TRS is generally used to control an environmental condition (e.g., temperature, humidity, air quality, and the like) within a cargo space of a transport unit (e.g., a truck, a container (such as a container on a flat car, an intermodal container, etc.), a box car, a semi-tractor, a bus, or other similar transport unit). The TRS can maintain environmental condition(s) of the cargo space to maintain cargo (e.g., produce, frozen foods, pharmaceuticals, etc.). In some embodiments, the transport unit can include a HVAC system to control a climate within a passenger space of the vehicle.

SUMMARY

This disclosure relates generally to power and fault management of an electrically powered accessory component configured to be used with at least one of an electric vehicle, a trailer, or a transport container that is at least partially powered by the electric vehicle.

A power management system for managing power of a climate control unit (CCU) configured to be used with at least one of an electric vehicle, a trailer, or a transport container and at least partially powered by the electric vehicle is disclosed. The system includes a power distribution system that includes a power input, a power distributor electrically connected to the power input, a fault detecting and isolating circuit electrically connected to the power input, and a connection point for receiving the CCU. The connection point is electrically connected to the fault detecting and isolating circuit. A power controller is electrically connected to the power distribution system. The power controller includes a processor and a memory.

An electric vehicle is disclosed that includes a battery; and a climate control unit (CCU) electrically connected to the battery and configured to receive power from the battery. The CCU is configured to be used with at least one of the electric vehicle, a trailer, or a transport container. A power management system includes a power distribution system that includes a power input, a power distributor electrically connected to the power input, a fault detecting and isolating circuit electrically connected to the power input, and a connection point for receiving the CCU. The connection point is electrically connected to the fault detecting and isolating circuit. A power controller is electrically connected to the power distribution system. The power controller includes a processor and a memory.

A method for managing power of a climate control unit (CCU) that is configured to be used with at least one of an electric vehicle, a trailer, or a transport container and at least partially powered by the electric vehicle is disclosed. The method includes monitoring, by a power controller, a fault detecting and isolating circuit for an electrical fault of a CCU that is electrically connected to the fault detecting and isolating circuit. The power controller isolates the electrical fault as identified in the monitoring. The power controller monitors the fault detecting and isolating circuit for an indication the electrical fault is no longer present.

A power management system for managing power of an accessory electrical component configured to be used with at least one of an electric vehicle, a trailer, or a transport container and at least partially powered by the electric vehicle is disclosed. The power management system includes a power distribution system. The power distribution system includes a power input, a power distributor electrically connected to the power input, a fault detecting and isolating circuit electrically connected to the power input, and a connection point for receiving the accessory electrical component. The connection point is electrically connected to the fault detecting and isolating circuit. A power controller is electrically connected to the power distribution system. The power controller includes a processor and a memory.

In an embodiment, the connection point includes a plurality of connection points and the accessory electrical component includes a plurality of accessory electrical components.

An electric vehicle is also disclosed. The electric vehicle includes a battery. An accessory electrical component is electrically connected to the battery and configured to receive power from the battery. The accessory electrical component is configured to be used with at least one of the electric vehicle, a trailer, or a transport container. A power management system includes a power distribution system. The power distribution system includes a power input, a power distributor electrically connected to the power input, a fault detecting and isolating circuit electrically connected to the power input, and a connection point for receiving the accessory electrical component. The connection point is electrically connected to the fault detecting and isolating circuit. A power controller is electrically connected to the power distribution system. The power controller includes a processor and a memory.

In an embodiment, the connection point includes a plurality of connection points and the accessory electrical component includes a plurality of accessory electrical components.

A method for managing power of an electrically powered accessory that is configured to be used with at least one of an electric vehicle, a trailer, or a transport container and at least partially powered by the electric vehicle is disclosed. The method includes monitoring, by a power controller, a fault detecting and isolating circuit for an electrical fault of an accessory electrical component that is electrically connected to the fault detecting and isolating circuit. The power controller isolates the electrical fault as identified in the monitoring. The power controller monitors the fault detecting and isolating circuit for an indication the electrical fault is no longer present.

In an embodiment, the connection point includes a plurality of connection points and the accessory electrical component includes a plurality of accessory electrical components.

BRIEF DESCRIPTION OF THE DRAWINGS

References are made to the accompanying drawings that form a part of this disclosure, and which illustrate embodiments in which the systems and methods described in this Specification can be practiced.

FIG. 1A illustrates a side view of a truck with a front wall mounted vehicle powered transport refrigeration unit, according to an embodiment.

FIG. 1B illustrates a schematic cross sectional side view of a refrigerated transport unit with a multi-temp transport refrigeration system, according to an embodiment.

FIG. 1D illustrates a front perspective view of an APU, according to an embodiment.

Like reference numbers represent like parts throughout.

DETAILED DESCRIPTION

Figure 1C:
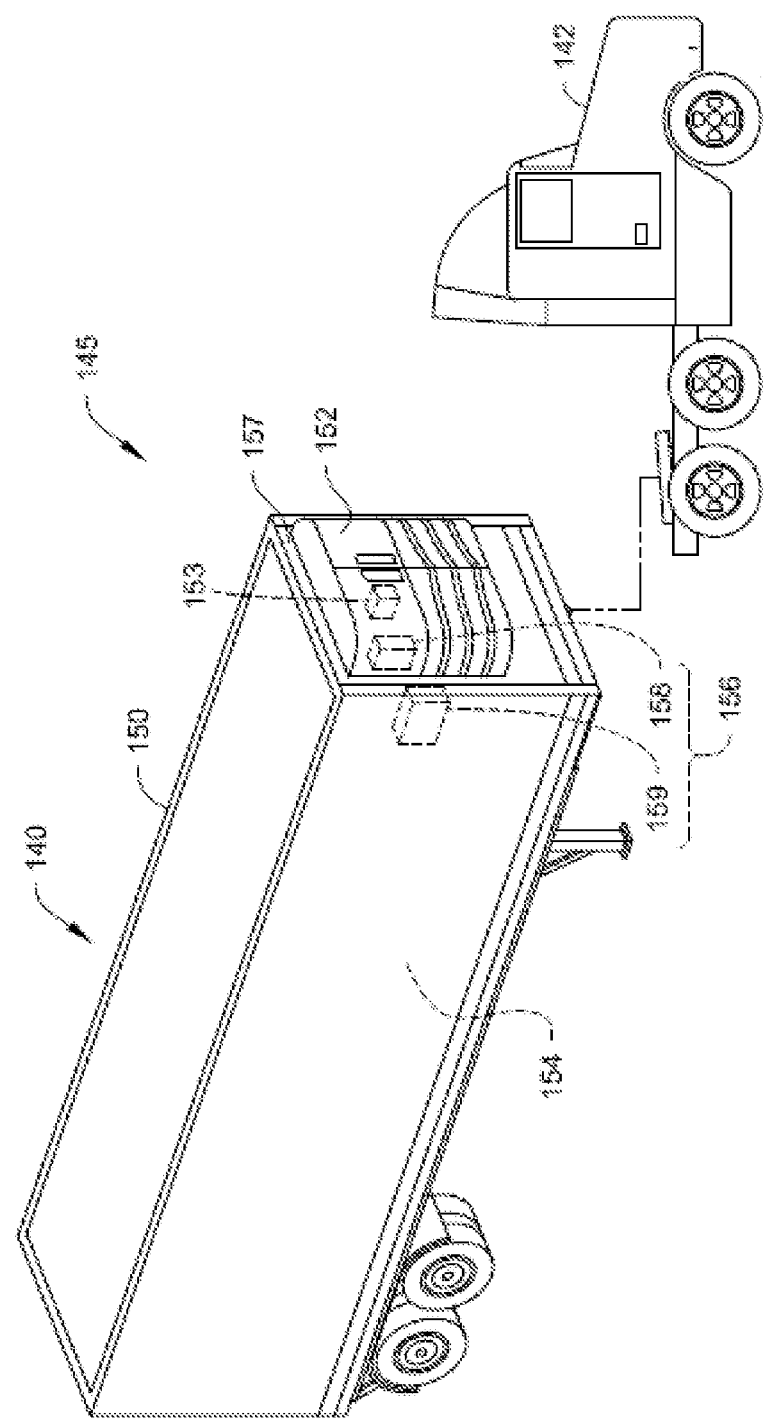
FIG. 1C illustrates a perspective view of a vehicle with an APU, according to an embodiment.

This disclosure relates generally to power and fault management of an electrically powered accessory component configured to be used with at least one of an electric vehicle, a trailer, or a transport container, that is at least partially powered by the electric vehicle.

In an electrical vehicle, such as an electric vehicle including an electrically powered accessory component associated with a vehicle, a trailer, or a transport container (e.g., a transport climate control system), a variety of electrical systems can be operated utilizing shared power sources. In some instances, when a fault occurs in a particular electrical system (e.g., a component or a plurality of components), the entire powered system may be shut down or otherwise prevented from operating. As a result, such faults can prevent a risk. For example, when a fault occurs in an electrical system, it may be problematic to have an entire shutdown including critical systems, including but not limited to, safety systems. Accordingly, isolating the electrical system having the fault within the power distribution system can preserve partial system operation. Similarly, in a situation in which stored energy systems experience a fault (e.g., one battery within a battery bank, or the like), it may be beneficial to preserve some power output capabilities by isolating the faulty portion of the stored energy system to enable continued partial operation of the overall system. Partial system operation can be particularly advantageous when the electric vehicle is in transport.

Embodiments of this disclosure are directed to a power management system that can monitor fault reports and control parameters of the power users (e.g., accessories) and the power distribution system. In cases where faults occur in specific sub-systems, the power controller can open contactors and connections to remove the faulted sub-system and allow for continued operation of the non-faulted systems. Alternatively, the power management system can perform alternate connections of battery modules to isolate failed modules and allow for partial power connections that would still be usable to the system. Thus embodiments of this disclosure can, for example, reduce scenarios in which a faulty sub-system results in a complete shutdown of the functioning systems within the electric vehicle.

An accessory electrical component is an electrically powered accessory configured to be used with at least one of a vehicle, trailer, and a transport container. The accessory electrical component can alternatively be referred to as an electrically powered accessory. The accessory electrical component can be a smart electrical component or a simple electrical component. A smart electrical component generally includes an onboard processor that can provide feedback to a power controller. The feedback can include, for example, electrical load information, predicted energy levels, power usage information, health diagnostic information, or the like. A simple electrical component generally does not include an onboard processor and has a non-actively managed load. Simple electrical components may not provide feedback information to a power controller.

The embodiments described below generally illustrate different embodiments of a transport climate control system. It is to be appreciated that the accessory electrically powered components are not limited to the transport climate control system or a climate control unit (CCU) of the transport climate control system. A CCU may be, for example, a transport refrigeration unit (TRU).

In an embodiment, the accessory electrical component may be, for example, a crane attached to a vehicle; a cement mixer attached to a truck; one or more food appliances of a food truck; a boom arm attached to a vehicle; a concrete pumping truck; a refuse truck; a fire truck (with a power driven ladder, pumps, lights, or the like); suitable combinations thereof, or the like. The accessory electrical component may require continuous power even when the ignition of the vehicle is turned off or the vehicle is parked, idling, charging, or combinations thereof. The accessory electrical component may require substantial power to operate, continuous operation, autonomous operation (e.g., controlling temperature/humidity/airflow of a climate-controlled space) on an as needed basis, or combinations thereof, independent of the operational mode of the vehicle.

FIG. 1A depicts a climate-controlled van 100 that includes a climate controlled space 105 for carrying cargo and a transport climate control system 110 for providing climate control within the climate controlled space 105. The transport climate control system 110 includes a climate control unit (CCU) 115 that is mounted to a rooftop 120 of the van 100. The transport climate control system 110 can include, amongst other components, a climate control circuit (see FIG. 2) that connects, for example, a compressor, a condenser, an evaporator and an expansion device to provide climate control within the climate controlled space 105. It will be appreciated that the embodiments described herein are not limited to climate-controlled vans, but can apply to any type of transport unit (e.g., a truck, a container (such as a container on a flat car, an intermodal container, a marine container, etc.), a box car, a semi-tractor, a bus, or other similar transport unit), etc.

The transport climate control system 110 also includes a programmable climate controller 125 and one or more sensors (not shown) that are configured to measure one or more parameters of the transport climate control system 110 (e.g., an ambient temperature outside of the van 100, an ambient humidity outside of the van 100, a compressor suction pressure, a compressor discharge pressure, a supply air temperature of air supplied by the CCU 115 into the climate controlled space 105, a return air temperature of air returned from the climate controlled space 105 back to the CCU 115, a humidity within the climate controlled space 105, etc.) and communicate parameter data to the climate controller 125. The climate controller 125 is configured to control operation of the transport climate control system 110 including the components of the climate control circuit. The climate controller 115 may comprise a single integrated control unit 126 or may comprise a distributed network of climate controller elements 126, 127. The number of distributed control elements in a given network can depend upon the particular application of the principles described herein.

FIG. 1B depicts a climate-controlled straight truck 130 that includes a climate controlled space 131 for carrying cargo and a transport climate control system 132. The transport climate control system 132 includes a CCU 133 that is mounted to a front wall 134 of the climate controlled space 131. The CCU 133 can include, amongst other components, a climate control circuit (see FIG. 2) that connects, for example, a compressor, a condenser, an evaporator and an expansion device to provide climate control within the climate controlled space 131.

The transport climate control system 132 also includes a programmable climate controller 135 and one or more sensors (not shown) that are configured to measure one or more parameters of the transport climate control system 132 (e.g., an ambient temperature outside of the truck 130, an ambient humidity outside of the truck 130, a compressor suction pressure, a compressor discharge pressure, a supply air temperature of air supplied by the CCU 133 into the climate controlled space 131, a return air temperature of air returned from the climate controlled space 131 back to the CCU 133, a humidity within the climate controlled space 131, etc.) and communicate parameter data to the climate controller 135. The climate controller 135 is configured to control operation of the transport climate control system 132 including components of the climate control circuit. The climate controller 135 may comprise a single integrated control unit 136 or may comprise a distributed network of climate controller elements 136, 137. The number of distributed control elements in a given network can depend upon the particular application of the principles described herein.

FIG. 1C illustrates one embodiment of a climate controlled transport unit 140 attached to a tractor 142. The climate controlled transport unit 140 includes a transport climate control system 145 for a transport unit 150. The tractor 142 is attached to and is configured to tow the transport unit 150. The transport unit 150 shown in FIG. 1C is a trailer.

The transport climate control system 145 includes a CCU 152 that provides environmental control (e.g. temperature, humidity, air quality, etc.) within a climate controlled space 154 of the transport unit 150. The CCU 152 is disposed on a front wall 157 of the transport unit 150. In other embodiments, it will be appreciated that the CCU 152 can be disposed, for example, on a rooftop or another wall of the transport unit 150. The CCU 152 includes a climate control circuit (see FIG. 2) that connects, for example, a compressor, a condenser, an evaporator and an expansion device to provide conditioned air within the climate controlled space 154.

The transport climate control system 145 also includes a programmable climate controller 156 and one or more sensors (not shown) that are configured to measure one or more parameters of the transport climate control system 145 (e.g., an ambient temperature outside of the transport unit 150, an ambient humidity outside of the transport unit 150, a compressor suction pressure, a compressor discharge pressure, a supply air temperature of air supplied by the CCU 152 into the climate controlled space 154, a return air temperature of air returned from the climate controlled space 154 back to the CCU 152, a humidity within the climate controlled space 154, etc.) and communicate parameter data to the climate controller 156. The climate controller 156 is configured to control operation of the transport climate control system 145 including components of the climate control circuit. The climate controller 156 may comprise a single integrated control unit 158 or may comprise a distributed network of climate controller elements 158, 159. The number of distributed control elements in a given network can depend upon the particular application of the principles described herein.

FIG. 1D illustrates another embodiment of a climate controlled transport unit 160. The climate controlled transport unit 160 includes a multi-zone transport climate control system (MTCS) 162 for a transport unit 164 that can be towed, for example, by a tractor (not shown). It will be appreciated that the embodiments described herein are not limited to tractor and trailer units, but can apply to any type of transport unit (e.g., a truck, a container (such as a container on a flat car, an intermodal container, a marine container, etc.), a box car, a semi-tractor, a bus, or other similar transport unit), etc.

The MTCS 162 includes a CCU 166 and a plurality of remote units 168 that provide environmental control (e.g. temperature, humidity, air quality, etc.) within a climate controlled space 170 of the transport unit 164. The climate controlled space 170 can be divided into a plurality of zones 172. The term "zone" means a part of an area of the climate controlled space 170 separated by walls 174. The CCU 166 can operate as a host unit and provide climate control within a first zone 172a of the climate controlled space 166. The remote unit 168a can provide climate control within a second zone 172b of the climate controlled space 170. The remote unit 168b can provide climate control within a third zone 172c of the climate controlled space 170. Accordingly, the MTCS 162 can be used to separately and independently control environmental condition(s) within each of the multiple zones 172 of the climate controlled space 162.

The CCU 166 is disposed on a front wall 167 of the transport unit 160. In other embodiments, it will be appreciated that the CCU 166 can be disposed, for example, on a rooftop or another wall of the transport unit 160. The CCU 166 includes a climate control circuit (see FIG. 2) that connects, for example, a compressor, a condenser, an evaporator and an expansion device to provide conditioned air within the climate controlled space 170. The remote unit 168a is disposed on a ceiling 179 within the second zone 172b and the remote unit 168b is disposed on the ceiling 179 within the third zone 172c. Each of the remote units 168a, b include an evaporator (not shown) that connects to the rest of the climate control circuit provided in the CCU 166.

The MTCS 162 also includes a programmable climate controller 180 and one or more sensors (not shown) that are configured to measure one or more parameters of the MTCS 162 (e.g., an ambient temperature outside of the transport unit 164, an ambient humidity outside of the transport unit 164, a compressor suction pressure, a compressor discharge pressure, supply air temperatures of air supplied by the CCU 166 and the remote units 168 into each of the zones 172, return air temperatures of air returned from each of the zones 172 back to the respective CCU 166 or remote unit 168a or 168b, a humidity within each of the zones 118, etc.) and communicate parameter data to a climate controller 180. The climate controller 180 is configured to control operation of the MTCS 162 including components of the climate control circuit. The climate controller 180 may comprise a single integrated control unit 181 or may comprise a distributed network of climate controller elements 181, 182. The number of distributed control elements in a given network can depend upon the particular application of the principles described herein.

Figure 1E:
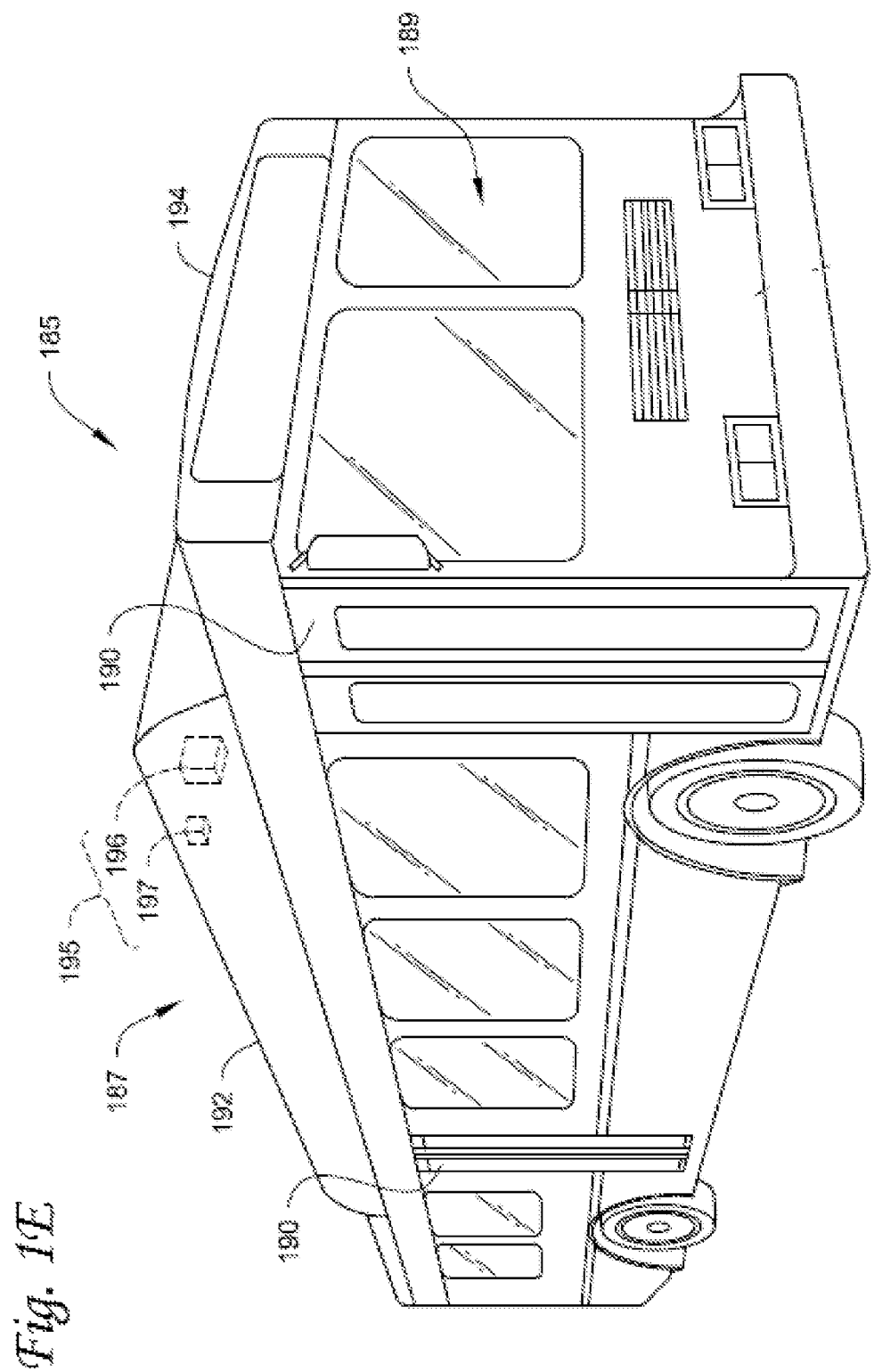
FIG. 1E illustrates a side view of a van with a roof mounted vehicle powered transport refrigeration unit, according to an embodiment.

FIG. 1E is a perspective view of a vehicle 185 including a transport climate control system 187, according to one embodiment. The vehicle 185 is a mass-transit bus that can carry passenger(s) (not shown) to one or more destinations. In other embodiments, the vehicle 185 can be a school bus, railway vehicle, subway car, or other commercial vehicle that carries passengers. The vehicle 185 includes a climate controlled space (e.g., passenger compartment) 189 supported that can accommodate a plurality of passengers. The vehicle 185 includes doors 190 that are positioned on a side of the vehicle 185. In the embodiment shown in FIG. 1E, a first door 190 is located adjacent to a forward end of the vehicle 185, and a second door 190 is positioned towards a rearward end of the vehicle 185. Each door 190 is movable between an open position and a closed position to selectively allow access to the climate controlled space 189. The transport climate control system 187 includes a CCU 192 attached to a roof 194 of the vehicle 185.

The CCU 170 includes a climate control circuit (see FIG. 2) that connects, for example, a compressor, a condenser, an evaporator and an expansion device to provide conditioned air within the climate controlled space 189. The transport climate control system 187 also includes a programmable climate controller 195 and one or more sensors (not shown) that are configured to measure one or more parameters of the transport climate control system 187 (e.g., an ambient temperature outside of the vehicle 185, a space temperature within the climate controlled space 189, an ambient humidity outside of the vehicle 185, a space humidity within the climate controlled space 189, etc.) and communicate parameter data to the climate controller 195. The climate controller 195 is configured to control operation of the transport climate control system 187 including components of the climate control circuit. The climate controller 195 may comprise a single integrated control unit 196 or may comprise a distributed network of climate controller elements 196, 197. The number of distributed control elements in a given network can depend upon the particular application of the principles described herein.

Figure 2:
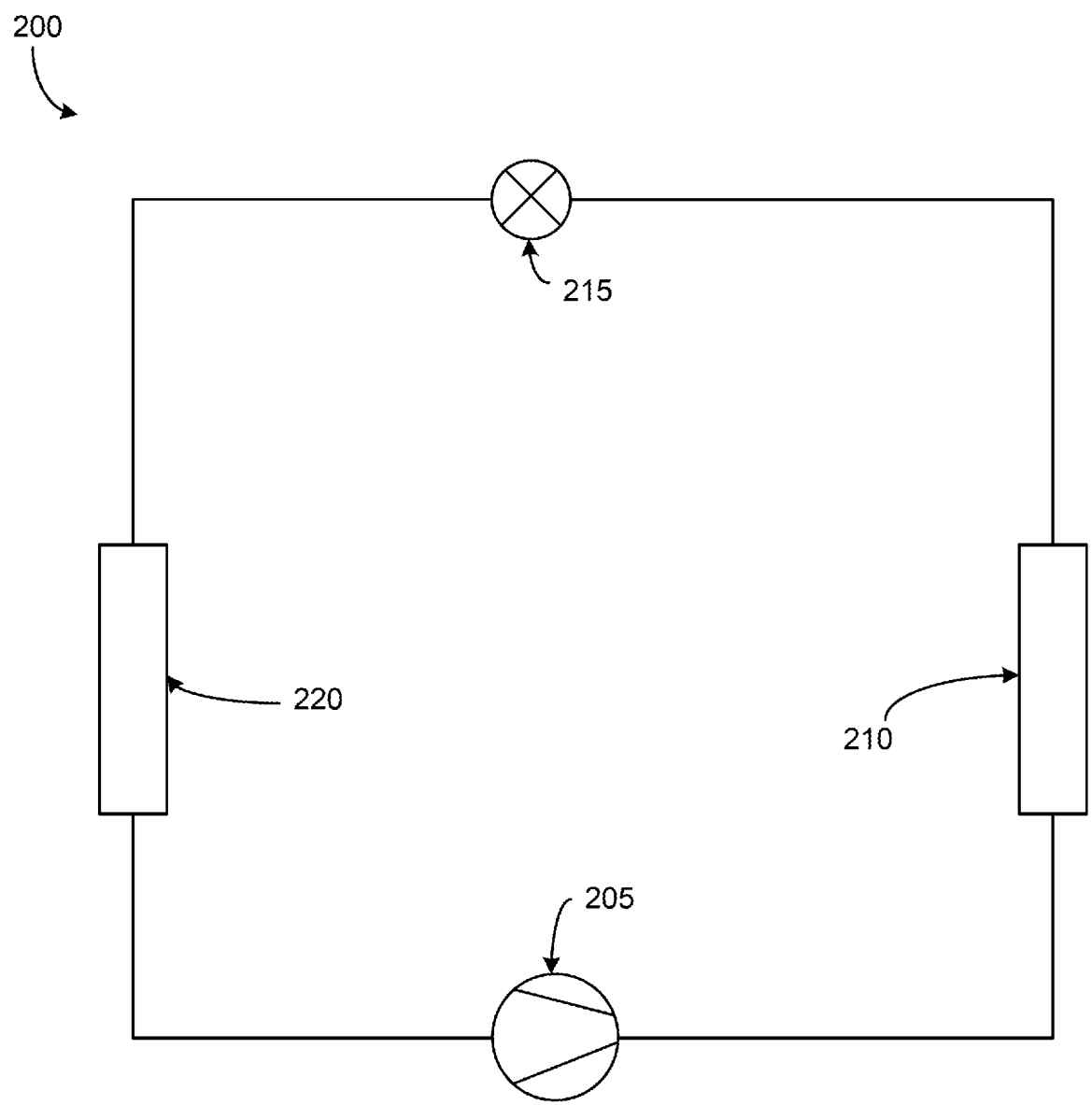
FIG. 2 is a schematic diagram of a climate control circuit, according to an embodiment.

FIG. 2 is a schematic diagram of a climate control circuit 200, according to some embodiments. The climate control circuit 200 generally includes a compressor 205, a condenser 210, an expansion device 215, and an evaporator 220. The compressor 205 can be, for example, a scroll compressor, a reciprocal compressor, or the like.

The climate control circuit 200 is exemplary and can be modified to include additional components. For example, in some embodiments the climate control circuit 200 can include an economizer heat exchanger, one or more flow control devices (e.g., valves or the like), a receiver tank, a dryer, a suction-liquid heat exchanger, or the like.

The climate control circuit 200 can generally be applied in a variety of systems used to control an environmental condition (e.g., temperature, humidity, air quality, or the like) in a space (generally referred to as a climate controlled space). Examples of systems include, but are not limited to the climate control systems shown and described above in accordance with FIGS. 1A-1E.

The components of the climate control circuit 200 are fluidly connected. The climate control circuit 200 can be specifically configured to be a cooling system (e.g., an air conditioning system) capable of operating in a cooling mode. Alternatively, the climate control circuit 200 can be specifically configured to be a heat pump system which can operate in both a cooling mode and a heating/defrost mode.

Climate control circuit 200 operates according to generally known principles. The climate control circuit 200 can be configured to heat or cool heat transfer fluid or medium (e.g., a gas such as, but not limited to, air or the like), in which case the climate control circuit 200 may be generally representative of an air conditioner or heat pump.

In operation, the compressor 205 compresses a heat transfer fluid (e.g., refrigerant or the like) from a relatively lower pressure gas to a relatively higher-pressure gas. The relatively higher-pressure and higher temperature gas is discharged from the compressor 205 and flows through the condenser 210. In accordance with generally known principles, the heat transfer fluid flows through the condenser 10 and rejects heat to a heat transfer fluid or medium (e.g., air, etc.), thereby cooling the heat transfer fluid. The cooled heat transfer fluid, which is now in a liquid form, flows to the expansion device 215 (e.g., an expansion valve or the like). The expansion device 215 reduces the pressure of the heat transfer fluid. As a result, a portion of the heat transfer fluid is converted to a gaseous form. The heat transfer fluid, which is now in a mixed liquid and gaseous form flows to the evaporator 220. The heat transfer fluid flows through the evaporator 220 and absorbs heat from a heat transfer medium (e.g., air, etc.), heating the heat transfer fluid, and converting it to a gaseous form. The gaseous heat transfer fluid then returns to the compressor 205. The above-described process continues while the heat transfer circuit is operating, for example, in a cooling mode (e.g., while the compressor 205 is enabled).

Figure 3:
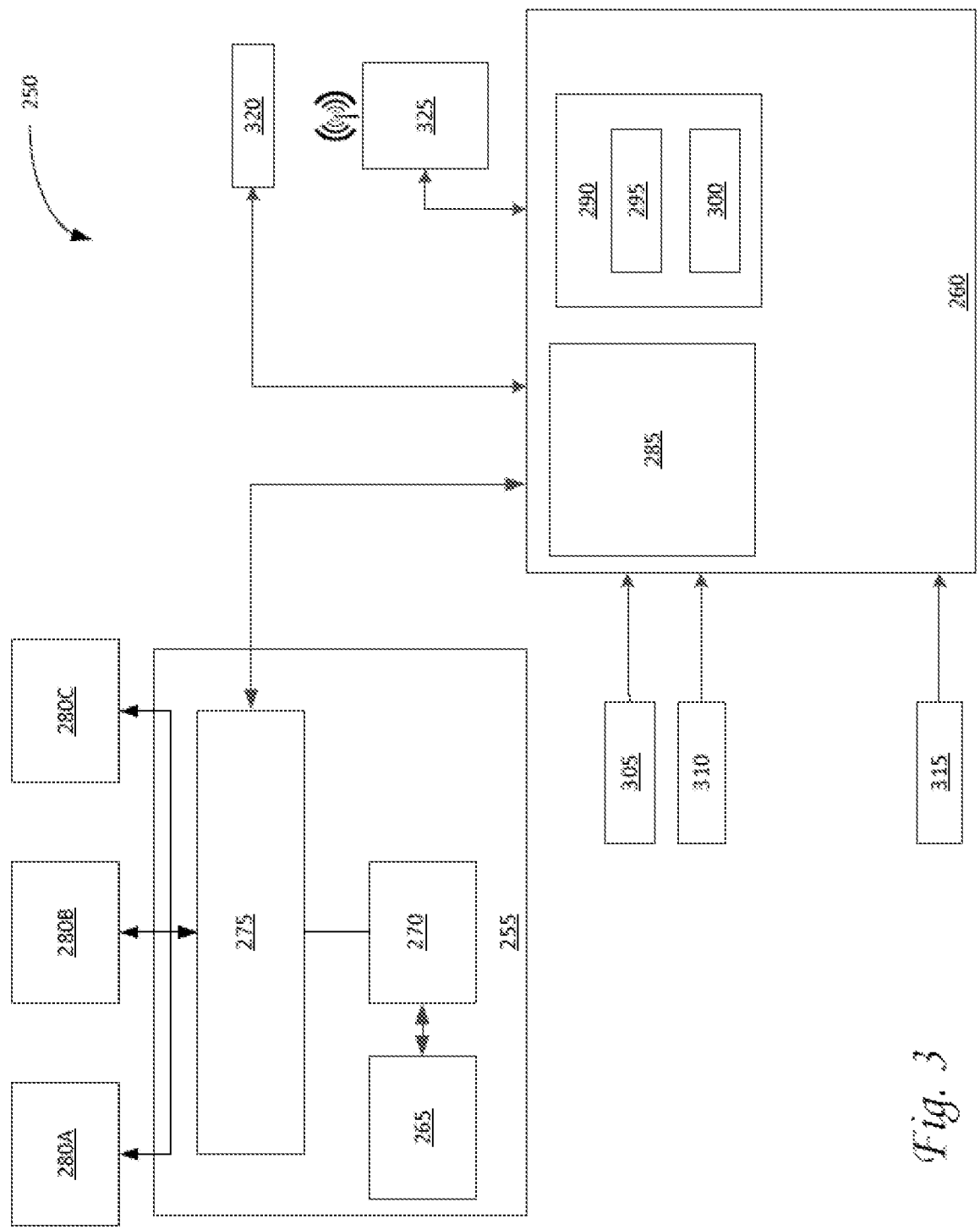
FIG. 3 illustrates a schematic diagram of a power management system, according to an embodiment.

FIG. 3 illustrates a schematic diagram of a power management system 250, according to an embodiment.

The power management system 250 can generally be used to ensure that in case of a fault of one accessory electrical component within a system of accessory electrical components, the remainder of the system of accessory electrical components can continue to be operational and the faulted accessory electrical component is kept isolated from the remainder of the system of accessory electrical components.

The power management system 250 includes a power distribution system 255 and a controller 260. The controller 260 can alternatively be referred to as the power controller 260. However, the controller 260 can serve more functions than just power level control, such as control of an associated electrically powered accessory (e.g., a CCU or the like). It is to be appreciated that the power controller 260 can be incorporated into the controller of the climate control system, such as within the CCU (see FIGS. 1A-1E) or can be separate from the CCU.

The power distribution system 255 includes a power input 265, a power distributor 270, and a fault detecting and isolating circuit 275. A plurality of accessory electrical components 280A-280C is connected in electrical communication with the power distributor 270 via the fault detecting and isolating circuit 275. Three accessory electrical components 280A-280C are shown. It is to be appreciated that this number is representative and that the actual number of accessory electrical components 275 can vary beyond three.

In the illustrated embodiment, the power distributor 270 and the fault detecting and isolating circuit 275 are electrically connected to the power input 265 in a series manner, with the first connection being to the power distributor 270 and then in series to fault detecting and isolating circuit 275. In an embodiment, the power input 265 can be representative of an electric power take off (ePTO).

The power distributor 270 can be used to selectively provide power from the power input 265 to the accessory electrical components 280A-280C. In an embodiment, the power distributor 270 can control a source of the power. In an embodiment, the power distributor 270 can enable connections from a power source via the power input 265 to the rest of the power management system 250. In an embodiment, the power distributor 270 can control a power convertor located between the power source and the power management system 250.

The fault detecting and isolating circuit 275 can include a variety of hardware for detecting a fault and isolating that fault within one of the accessory electrical components 280A-280C. Although the fault detecting and isolating circuit 275 is illustrated as being representative of both fault detection and isolation, it is to be appreciated that fault detection and fault isolation can be performed separately, such as via a fault detecting circuit and a fault isolating circuit. For example, in an embodiment, the fault detecting circuit is dedicated to fault detection and detects a fault in an accessory electrical component 280. In such an embodiment, a fault indicator can be provided to the power distribution controller 270 so that the fault isolating circuit can isolate the faulty accessory electrical component 280.

In an embodiment, the fault detecting and isolating circuit 275 can include one or more of a super junction, a metal-oxide-semiconductor field-effect transistor (MOSFET), a solid state transformer, one or more power electronic transformers, an isolation mechanism, a contactor (could have multiple in series), or suitable combinations thereof. In an embodiment, the fault detecting and isolating circuit 275 can perform a fast Fourier transform (FFT) to monitor for a signal that is at a level other than what is expected from one of the accessory electrical components 280A-280C to determine when one or more is operating at a frequency indicative of a fault condition. For example, the power controller 260 knows at which frequency a compressor drive (e.g., in a climate control system) is operating (e.g., 100 Hz). If the FFT is performed and shows that the 100 Hz bin is bigger than a threshold value, the compressor drive circuit can be alerted to be checked as a fault could be present.

There can be multiple types of fault detection circuits within the fault detecting and isolating circuit 275. Examples include, but are not limited to, an insulation and/or isolation monitoring circuit including, but not limited to DC isolation checking, AC isolation checking, or suitable combinations thereof.

In DC isolation checking, the fault detecting and isolating circuit 275 monitors a leakage current from an isolated power supply and the references being isolated (e.g., chassis on a vehicle). The monitoring can be passive in which an established midpoint is monitored to confirm that the voltage signal stays midway between power supply positive and power supply negative (reference). If the voltage signal is closer to the negative or positive than it is to half the difference, then a fault is causing the imbalance. For example, a 400 volt DC bus has a midpoint of 200 volts DC. If, using a measurement circuit, the difference between positive and midpoint is 150 volts and the difference between negative and midpoint is 250 volts, there is a leakage causing the voltage imbalance as the measurement circuit should be balanced. The monitoring can be performed with a direct current signal injected, or superimposing on top of existing voltages which adds charge, and can include additional test resistances or isolated power supplies that check that the charge stays in isolation and is not leaking to the reference. The measurement of leakage is a current sensed. In an embodiment, DC isolation checking is simple and relatively fast.

In AC isolation checking, the fault detecting and isolating circuit 275 monitors the resistance and capacitance between the isolated power supply and the references being isolated (e.g., from high voltage battery to chassis of vehicle). The monitoring can be done by injecting an alternating current signal, or superimposing on top of existing voltages which adds charge, from an isolated power supply for measurement. Similar to the DC isolation checking, when charge is added the leakage is below a threshold, otherwise there is an isolation (insulation) fault. Leakage can be measured as amplitude of the signal at specific times. This can take several minutes to conduct because of the time constant of the system.

To determine a location of the fault, specific portions of the circuit network can be disconnected and measurement (with isolation monitor) can be performed. In an embodiment, this can help deduce which part of the circuit network has an issue. For example, if a compressor drive output is removed by switching out and the fault is no longer present, then that part of the circuit should not be turned on again and an alert for maintenance can be generated.

The accessory electrical components 280A-280C are generally representative of any power consuming accessory component that can be connected to an electric vehicle. The accessory electrical components 280A-280C can be an original equipment manufacturer (OEM) accessory or can be a part of the electric vehicle. The components 280A-280C can be accessories connected by the electric vehicle manufacturer or can be accessory components connected subsequent to manufacturing. The accessory electrical components 280A-280C can be components of a climate control system, according to an embodiment. In an embodiment, the accessory electrical components 280A-280C can include components separate from and unrelated to the climate control system.

The components 280A-280C can generally be either a smart component or a simple component. A smart component generally includes an onboard processor that can provide feedback to the power distribution system 255. The feedback can include, for example, electrical load information, predicted energy levels, power usage information, health diagnostic information, or the like. A simple component generally does not include an onboard processor and instead has a non-actively managed load. In an embodiment, simple components may not provide feedback information to the power controller 260.

The power controller 260 includes a processor 285 and a memory 290. The memory can include one or more stored rules such as temperature control requirements 295 and exception rules 300. The temperature control requirements 295 can include one or more rules related to the operation of the climate control system of the electric vehicle. The exception rules 300 can include one or more rules associated with actions to be taken when a fault is detected by the fault detecting and isolating circuit 275. The rules can include, for example, rules for how to deal with a particular accessory electrical component or can include rules that create relationships between the different accessory electrical components. For example, a rule can indicate that if a fault occurs in accessory electrical component 280A, then accessory electrical component 280B can continue to operate, but accessory electrical component 280C should be bypassed in addition to bypassing accessory electrical component 280A. It is to be appreciated that this is an example and that other relationships can be created. For example, if accessory electrical component 280A includes a fault, and the accessory electrical component 280A could expose a user to an electrical safety hazard, then a shutdown could be initiated. That is, the exception rules 300 can also define severities for the fault conditions.

The power controller 260 is connected in electrical communication with a plurality of sensors 305-315 which can provide additional operating information of, for example, the climate control system of the electric vehicle. For example, 305 can be representative of a sensor configured to indicate whether a door of the electric vehicle is open or closed, 310 can be representative of a motion detector in a controlled space of the climate control system, and 315 can be representative of one or more sensors monitoring space conditions within the controlled space of the climate control system.

The power controller 260 can be electrically connected to a user input 320 configured to enable a user to override the fault detecting and isolating circuit 275. The power controller 260 can also be electrically connected to a network 325 to, for example, provide operating information of the power control system 250; receive updates, or the like.

It is to be appreciated that FIG. 3 can include one or more additional components such as, but not limited to, a power manager (such as the power manager 330 in FIG. 4 below).

Figure 4:
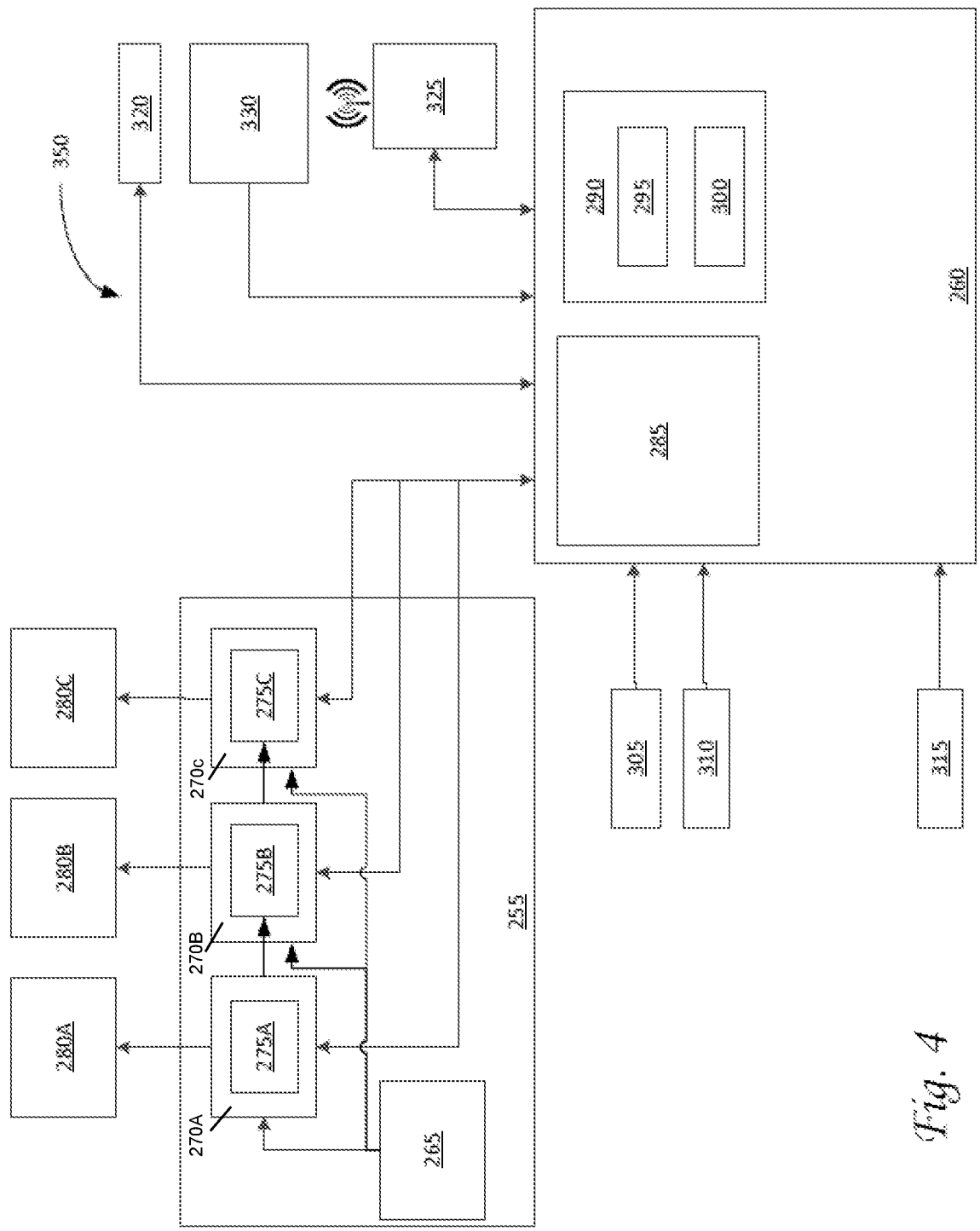
FIG. 4 illustrates a schematic diagram of a power management system, according to another embodiment.

FIG. 4 illustrates a schematic diagram of a power management system 350, according to an embodiment. The power management system 350 includes similar architecture and functionality as the power management system 250 in FIG. 3. Accordingly, like features are identified with like numbers. The primary distinction between the power management system 350 and the power management system 250 of FIG. 3 is in the power distribution system 255.

The power input 265 of the power distribution system 255 is connected in parallel to a plurality of power distributors 270A-270C. The power distribution system 255 also includes a plurality of fault detecting and isolating circuits 275A-275C. In the power distribution system 255 of FIG. 4, each of the electrical accessory components 280A-280C is connected to one of the power distributors 270A-270C and one of the fault detecting and isolating circuits 275A-275C. As a result, control can be more specific to each of the electrical accessory components 280A-280C. As can be seen in the illustration, the fault detecting and isolating circuits 275A-275C are connected in series, and can be ordered such that smart components are connected in a higher priority location than the simple components. In an embodiment, the sequence of the connections may not be related to the priority of each electrical accessory component 280A-280C. That is, the physical connection provides a daisy chain for communication, and is not concerned with establishing priority. It is to be appreciated that priority could be set in the power controller 260 regardless of the sequence in which the electrical accessory components 280A-280C are connected. In an embodiment, the power management system 250 in FIG. 3 can provide hardware redundancies and additional ability to isolate fault even when communication problems occur, which may not be possible in the power management system 350 in FIG. 4.

The power controller 260 in the power management system 250 can additionally be electrically connected with an external power manager 330 that can, for example, limit total system power draw or power draw of the power input 265. The external power manager 330 can include one or more rules for limiting a total power draw of the power distribution system 255. For example, the power manager 330 can include rules identifying that, when a door of the electric vehicle is opened, power draw for other accessory electrical components are reduced.

Figure 5:
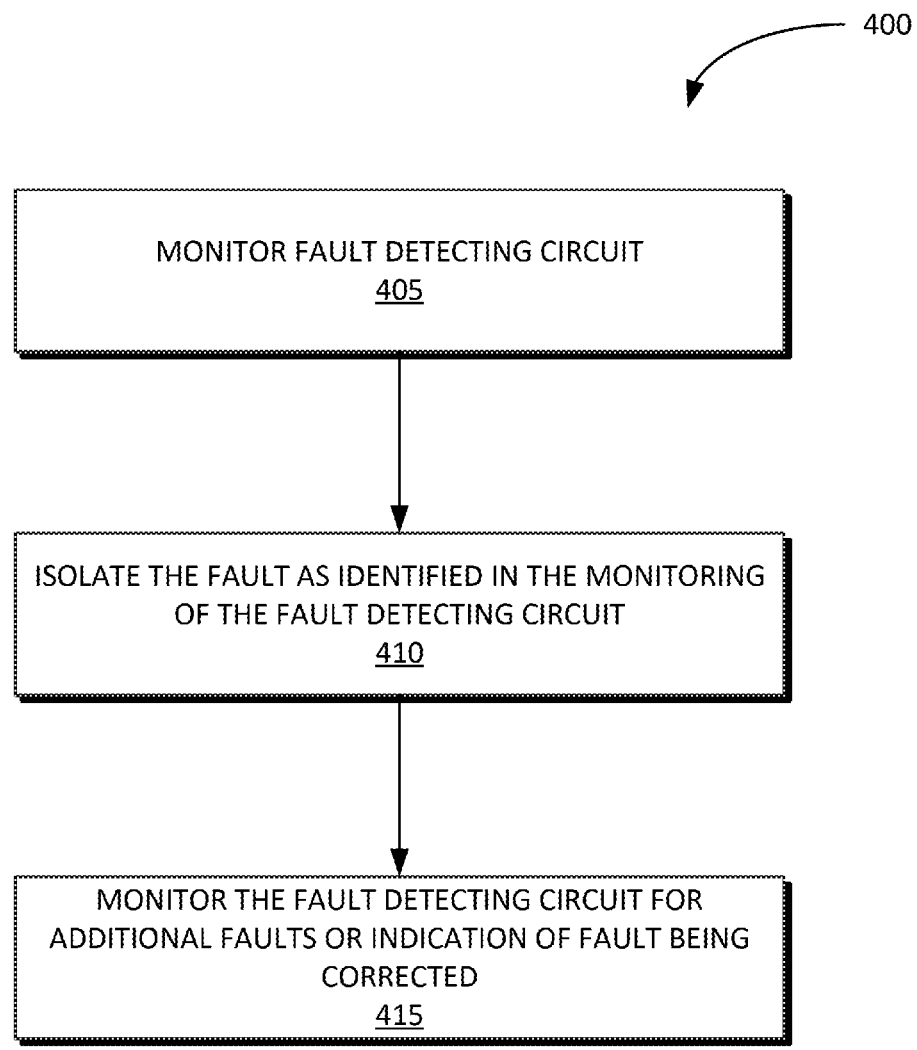
FIG. 5 illustrates a flowchart of a method for managing power of electrically powered accessories within an electric vehicle, according to an embodiment.

FIG. 5 illustrates a flowchart of a method 400 for managing power of electrically powered accessories within an electric vehicle, according to an embodiment. The method 400 generally is operational when power is provided to a power controller (e.g., the power controller 260 in FIGS. 3 and 4) of an electric vehicle for monitoring and handling faults in accessory electrical components connected to the electric vehicle.

At 405, the power controller 260 monitors a fault detecting and isolating circuit (e.g., the fault detecting and isolating circuit 275) to determine whether a fault occurs in any connected accessory electrical component. In an embodiment, the fault indication may come directly from the accessory electrical component and be passed to the power controller 260 via the fault detecting and isolating circuit 275. In such instances, the accessory electrical component may be a smart component. In another embodiment, the fault indication may be determined by the fault detecting and isolating circuit 275. Such an embodiment may be indicative of a fault in a simple component.

At 410, the power controller 260 may take action to isolate the fault. The action taken at 410 may be dependent upon one or more exception rules that are stored within a memory of the power controller 260. Generally, the isolation includes shutting down the faulty accessory electrical component. In an embodiment, if the accessory electrical component is a smart component, the accessory electrical component may be able to disable or shut down only the problematic aspect causing the fault. In an embodiment, at 410 the accessory electrical component can have a reduced load, voltage, or use of alternate connection paths and wiring in cases where parallel wiring is used to enable the load to be reduced (instead of being disabled or shut down). At 410, in addition to isolating the fault, a flag for service can be set (or a notification generated). The events can be time stamped as well. For example, the human machine interface (HMI), diagnostic light, service tool, wireless service information tool, or suitable combinations thereof can be used to inform an operator/owner/dealer/OEM that service is needed. In an embodiment, information about the issue can be sent for fault diagnoses and to determine why the issue occurred and used to prevent future issues. In an embodiment, this can assist with fault traceability via data logging.

At 415 the power controller 260 continues to monitor the fault detecting and isolating circuit and connected accessory electrical components for other faults or an indication that a fault is no longer present. The continued monitoring subsequent to a fault can be dependent upon the type of accessory electrical component in which the fault occurred at 410. For example, with a smart accessory electrical component, the accessory electrical component can be taken offline at 410 and at 415 the power controller 260 can poll a controller of the accessory electrical component to determine whether the accessory electrical component can be restarted. With a simple accessory electrical component, the accessory electrical component can be taken offline at 410 and at 415 the power controller 260 can attempt to bring the accessory electrical component back online.

Aspects

It is noted that any of aspects 1-7 can be combined with any of aspects 8-16, 17-20, 21-27, 28-36, or 37-40. Any of aspects 8-16 can be combined with any of aspects 17-20, 21-27, 28-36, or 37-40. Any of aspects 17-20 can be combined with any of aspects 21-27, 28-36, or 37-40. Any of aspects 21-27 can be combined with any of aspects 28-36 or 37-40. Any of aspects 28-36 can be combined with any of aspects 37-40.

Aspect 1. A power management system for managing power of an accessory electrical component configured to be used with at least one of an electric vehicle, a trailer, or a transport container and at least partially powered by the electric vehicle, comprising: a power distribution system, including: a power input, a power distributor electrically connected to the power input, a fault detecting and isolating circuit electrically connected to the power input, and a connection point for receiving the accessory electrical component, the connection point electrically connected to the fault detecting and isolating circuit; and a power controller electrically connected to the power distribution system, the power controller including a processor and a memory.

Aspect 2. The power management system of aspect 1, wherein the connection point includes a plurality of connection points, and wherein the fault detecting and isolating circuit is a single fault detecting and isolating circuit connected to the plurality of connection points in parallel.

Aspect 3. The power management system of any of aspects 1 or 2, wherein the connection point includes a plurality of connection points, and wherein the fault detecting and isolating circuit includes a plurality of fault detecting and isolating circuits corresponding to the plurality of connection points such that there is a one to one relationship of fault detecting and isolating circuits and connection points.

Aspect 4. The power management system of any of aspects 1-3, wherein the connection point includes a plurality of connection points, and wherein the fault detecting and isolating circuit includes one or more isolators configured to selectively enable or disable power from the power distributor to the plurality of connection points.

Aspect 5. The power management system of any of aspects 1-4, wherein the connection point includes a plurality of connection points, and wherein the power controller selectively enables or disables power from the power distributor to the plurality of connection points in response to a fault being identified in the fault detecting and isolating circuit.

Aspect 6. The power management system of any of aspects 1-5, wherein the connection point includes a plurality of connection points, and wherein the power distributor includes a plurality of power distributors connected in parallel and the fault detecting and isolating circuit includes a plurality of fault detecting and isolating circuits connected to the plurality of power distributors, the plurality of fault detecting and isolating circuits corresponding to the plurality of connection points such that there is a one to one relationship of fault detecting and isolating circuits and connection points, and the plurality of fault detecting and isolating circuits being connected in series.

Aspect 7. The power management system of any of aspects 1-6, wherein the power controller is electrically connected to a user input.

Aspect 8. An electric vehicle, comprising: a battery; an accessory electrical component electrically connected to the battery and configured to receive power from the battery, wherein the accessory electrical component is configured to be used with at least one of the electric vehicle, a trailer, or a transport container; and a power management system, including: a power distribution system, including: a power input electrically connected to the battery, a power distributor electrically connected to the power input, a fault detecting and isolating circuit electrically connected to the power input, and the accessory electrical component electrically connected to the fault detecting and isolating circuit via a connection point; and a power controller electrically connected to the power distribution system, the power controller including a processor and a memory.

Aspect 9. The electric vehicle of aspect 8, further comprising a power manager including one or more rules for limiting an amount of power that can be drawn from the battery.

Aspect 10. The electric vehicle of any of aspects 8 or 9, wherein the connection point includes a plurality of connection points, and wherein the fault detecting and isolating circuit is a single fault detecting and isolating circuit connected to the plurality of connection points in parallel.

Aspect 11. The electric vehicle of any of aspects 8-10, wherein the connection point includes a plurality of connection points, and wherein the fault detecting and isolating circuit includes a plurality of fault detecting and isolating circuits corresponding to the plurality of connection points such that there is a one to one relationship of fault detecting and isolating circuits and connection points.

Aspect 12. The electric vehicle of any of aspects 8-11, wherein the connection point includes a plurality of connection points, and wherein the fault detecting and isolating circuit includes one or more isolators configured to selectively enable or disable power from the power distributor to the plurality of connection points.

Aspect 13. The electric vehicle of any of aspects 8-12, wherein the connection point includes a plurality of connection points, and wherein the power controller selectively enables or disables power from the power distributor to the plurality of connection points in response to a fault being identified in the fault detecting and isolating circuit.

Aspect 14. The electric vehicle of any of aspects 8-13, wherein the connection point includes a plurality of connection points, and wherein the power distributor includes a plurality of power distributors connected in parallel and the fault detecting and isolating circuit includes a plurality of fault detecting and isolating circuits connected to the plurality of power distributors, the plurality of fault detecting and isolating circuits corresponding to the plurality of connection points such that there is a one to one relationship of fault detecting and isolating circuits and connection points, and the plurality of fault detecting and isolating circuits being connected in series.

Aspect 15. The electric vehicle of any of aspects 8-14, further comprising a user input electrically connected to the power controller.

Aspect 16. The electric vehicle of any of aspects 8-15, wherein the electric vehicle includes a vehicle, a trailer, or a transport container.

Aspect 17. A method for managing power of an electrically powered accessory that is configured to be used with at least one of an electric vehicle, a trailer, or a transport container and at least partially powered by the electric vehicle, the method comprising: monitoring, by a power controller, a fault detecting and isolating circuit for an electrical fault of an accessory electrical component that is electrically connected to the fault detecting and isolating circuit; isolating, by the power controller, the electrical fault as identified in the monitoring; and monitoring, by the power controller, the fault detecting and isolating circuit for an indication the electrical fault is no longer present.

Aspect 18. The method of aspect 17, further comprising monitoring for additional electrical faults.

Aspect 19. The method of any of aspects 17 or 18, wherein the isolating includes shutting down the accessory electrical component having the electrical fault.

Aspect 20. The method of aspect 19, further comprising attempting to bring the accessory electrical component having the electrical fault back online.

Aspect 21. A power management system for managing power of a climate control unit (CCU) configured to be used with at least one of an electric vehicle, a trailer, or a transport container and at least partially powered by the electric vehicle, comprising: a power distribution system, including: a power input, a power distributor electrically connected to the power input, a fault detecting and isolating circuit electrically connected to the power input, and a connection point for receiving the CCU, the connection point electrically connected to the fault detecting and isolating circuit; and a power controller electrically connected to the power distribution system, the power controller including a processor and a memory.

Aspect 22. The power management system of aspect 21, wherein the connection point includes a plurality of connection points, and wherein the fault detecting and isolating circuit is a single fault detecting and isolating circuit connected to the plurality of connection points in parallel.

Aspect 23. The power management system of one of aspects 21 or 22, wherein the connection point includes a plurality of connection points, and wherein the fault detecting and isolating circuit includes a plurality of fault detecting and isolating circuits corresponding to the plurality of connection points such that there is a one to one relationship of fault detecting and isolating circuits and connection points.

Aspect 24. The power management system of any of aspects 21-23, wherein the connection point includes a plurality of connection points, and wherein the fault detecting and isolating circuit includes one or more isolators configured to selectively enable or disable power from the power distributor to the plurality of connection points.

Aspect 25. The power management system of any of aspects 21-24, wherein the connection point includes a plurality of connection points, and wherein the power controller selectively enables or disables power from the power distributor to the plurality of connection points in response to a fault being identified in the fault detecting and isolating circuit.

Aspect 26. The power management system of any of aspects 21-25, wherein the connection point includes a plurality of connection points, and wherein the power distributor includes a plurality of power distributors connected in parallel and the fault detecting and isolating circuit includes a plurality of fault detecting and isolating circuits connected to the plurality of power distributors, the plurality of fault detecting and isolating circuits corresponding to the plurality of connection points such that there is a one to one relationship of fault detecting and isolating circuits and connection points, and the plurality of fault detecting and isolating circuits being connected in series.

Aspect 27. The power management system of any of aspects 21-26, wherein the power controller is electrically connected to a user input.

Aspect 28. An electric vehicle, comprising: a battery; a climate control unit (CCU) electrically connected to the battery and configured to receive power from the battery, wherein the CCU is configured to be used with at least one of the electric vehicle, a trailer, or a transport container; and a power management system, including: a power distribution system, including: a power input electrically connected to the battery, a power distributor electrically connected to the power input, a fault detecting and isolating circuit electrically connected to the power input, and the CCU electrically connected to the fault detecting and isolating circuit via a connection point; and a power controller electrically connected to the power distribution system, the power controller including a processor and a memory.

Aspect 29. The electric vehicle of aspect 28, further comprising a power manager including one or more rules for limiting an amount of power that can be drawn from the battery.

Aspect 30. The electric vehicle of any of aspects 28 or 29, wherein the connection point includes a plurality of connection points, and wherein the fault detecting and isolating circuit is a single fault detecting and isolating circuit connected to the plurality of connection points in parallel.

Aspect 31. The electric vehicle of any of aspects 28-30, wherein the connection point includes a plurality of connection points, and wherein the fault detecting and isolating circuit includes a plurality of fault detecting and isolating circuits corresponding to the plurality of connection points such that there is a one to one relationship of fault detecting and isolating circuits and connection points.

Aspect 32. The electric vehicle of any of aspects 28-31, wherein the connection point includes a plurality of connection points, and wherein the fault detecting and isolating circuit includes one or more isolators configured to selectively enable or disable power from the power distributor to the plurality of connection points.

Aspect 33. The electric vehicle of any of aspects 28-32, wherein the connection point includes a plurality of connection points, and wherein the power controller selectively enables or disables power from the power distributor to the plurality of connection points in response to a fault being identified in the fault detecting and isolating circuit.

Aspect 34. The electric vehicle of any of aspects 28-33, wherein the connection point includes a plurality of connection points, and wherein the power distributor includes a plurality of power distributors connected in parallel and the fault detecting and isolating circuit includes a plurality of fault detecting and isolating circuits connected to the plurality of power distributors, the plurality of fault detecting and isolating circuits corresponding to the plurality of connection points such that there is a one to one relationship of fault detecting and isolating circuits and connection points, and the plurality of fault detecting and isolating circuits being connected in series.

Aspect 35. The electric vehicle of any of aspects 28-34, further comprising a user input electrically connected to the power controller.

Aspect 36. The electric vehicle of any of aspects 28-35, wherein the electric vehicle includes a vehicle, a trailer, or a transport container.

Aspect 37. A method for managing power of a climate control unit (CCU) that is configured to be used with at least one of an electric vehicle, a trailer, or a transport container and at least partially powered by the electric vehicle, the method comprising: monitoring, by a power controller, a fault detecting and isolating circuit for an electrical fault of a CCU that is electrically connected to the fault detecting and isolating circuit; isolating, by the power controller, the electrical fault as identified in the monitoring; and monitoring, by the power controller, the fault detecting and isolating circuit for an indication the electrical fault is no longer present.

Aspect 38. The method of aspect 37, further comprising monitoring for additional electrical faults.

Aspect 39. The method of any of aspects 37 or 38, wherein the isolating includes shutting down the CCU having the electrical fault.

Aspect 40. The method of aspect 39, further comprising attempting to bring the CCU having the electrical fault back online.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

What is claimed is:

1. A power management system for managing power of a climate control unit (CCU) configured to be used with at least one of an electric vehicle, a trailer, or a transport container and at least partially powered by the electric vehicle, comprising:
    a power distribution system, including:
        a power input,
        a power distributor electrically connected to the power input,
        a fault detecting and isolating circuit electrically connected to the power input, and
        a connection point for receiving the CCU, the connection point electrically connected to the fault detecting and isolating circuit; and
    a power controller electrically connected to the power distribution system, the power controller including a processor and a memory,
    wherein the connection point includes a plurality of connection points, and wherein the power distributor includes a plurality of power distributors connected in parallel and the fault detecting and isolating circuit includes a plurality of fault detecting and isolating circuits connected to the plurality of power distributors, the plurality of fault detecting and isolating circuits corresponding to the plurality of connection points such that there is a one to one relationship of fault detecting and isolating circuits and connection points, and the plurality of fault detecting and isolating circuits being connected in series.

2. The power management system of claim 1, wherein the connection point includes a plurality of connection points, and wherein the fault detecting and isolating circuit includes a plurality of fault detecting and isolating circuits corresponding to the plurality of connection points such that there is a one to one relationship of fault detecting and isolating circuits and connection points.

3. The power management system of claim 1, wherein the connection point includes a plurality of connection points, and wherein the fault detecting and isolating circuit includes one or more isolators configured to selectively enable or disable power from the power distributor to the plurality of connection points.

4. The power management system of claim 1, wherein the connection point includes a plurality of connection points, and wherein the power controller selectively enables or disables power from the power distributor to the plurality of connection points in response to a fault being identified in the fault detecting and isolating circuit.

5. The power management system of claim 1, wherein the power controller is electrically connected to a user input.

6. An electric vehicle, comprising:
    a battery;
    a climate control unit (CCU) electrically connected to the battery and configured to receive power from the battery, wherein the CCU is configured to be used with at least one of the electric vehicle, a trailer, or a transport container; and
    a power management system, including:
        a power distribution system, including:
            a power input electrically connected to the battery,
            a power distributor electrically connected to the power input,
            a fault detecting and isolating circuit electrically connected to the power input, and
            the CCU electrically connected to the fault detecting and isolating circuit via a connection point; and
        a power controller electrically connected to the power distribution system, the power controller including a processor and a memory,
    wherein the connection point includes a plurality of connection points, and wherein the power distributor includes a plurality of power distributors connected in parallel and the fault detecting and isolating circuit includes a plurality of fault detecting and isolating circuits connected to the plurality of power distributors, the plurality of fault detecting and isolating circuits corresponding to the plurality of connection points such that there is a one to one relationship of fault detecting and isolating circuits and connection points, and the plurality of fault detecting and isolating circuits being connected in series.

7. The electric vehicle of claim 6, further comprising a power manager including one or more rules for limiting an amount of power that can be drawn from the battery.

8. The electric vehicle of claim 6, wherein the connection point includes a plurality of connection points, and wherein the fault detecting and isolating circuit includes a plurality of fault detecting and isolating circuits corresponding to the plurality of connection points such that there is a one to one relationship of fault detecting and isolating circuits and connection points.

9. The electric vehicle of claim 6, wherein the connection point includes a plurality of connection points, and wherein the fault detecting and isolating circuit includes one or more isolators configured to selectively enable or disable power from the power distributor to the plurality of connection points.

10. The electric vehicle of claim 6, wherein the connection point includes a plurality of connection points, and wherein the power controller selectively enables or disables power from the power distributor to the plurality of connection points in response to a fault being identified in the fault detecting and isolating circuit.

11. The electric vehicle of claim 6, further comprising a user input electrically connected to the power controller.

12. The electric vehicle of claim 6, wherein the electric vehicle includes a vehicle, a trailer, or a transport container.

13. A method for managing power of a climate control unit (CCU) that is configured to be used with at least one of an electric vehicle, a trailer, or a transport container and at least partially powered by the electric vehicle, the method comprising:

monitoring, by a power controller, a plurality of fault detecting and isolating circuits that are connected in series for an electrical fault of one of a plurality of accessory electrical components that are electrically connected to the plurality of fault detecting and isolating circuits;

isolating, by the power controller, the electrical fault at one of the plurality of accessory electrical components as identified in the monitoring of the plurality of fault detecting and isolating circuits; and monitoring, by the power controller, each of the fault detecting and isolating circuits for an indication the electrical fault at the one of the plurality of accessory electrical components is no longer present.

14. The method of claim 13, further comprising monitoring the plurality of fault detecting and isolating circuits for additional electrical faults.

15. The method of claim 13, wherein the isolating includes shutting down the one of the plurality of accessory electrical components having the electrical fault.

16. The method of claim 15, further comprising attempting to bring the one of the plurality of accessory electrical components having the electrical fault back online.

17. The method of claim 13, wherein isolating the electrical fault at the one of the plurality of accessory electrical components includes reducing at least one of a load, voltage and use of the one of the plurality of accessory electrical components.

\* \* \* \* \*